Figures 2, 3:
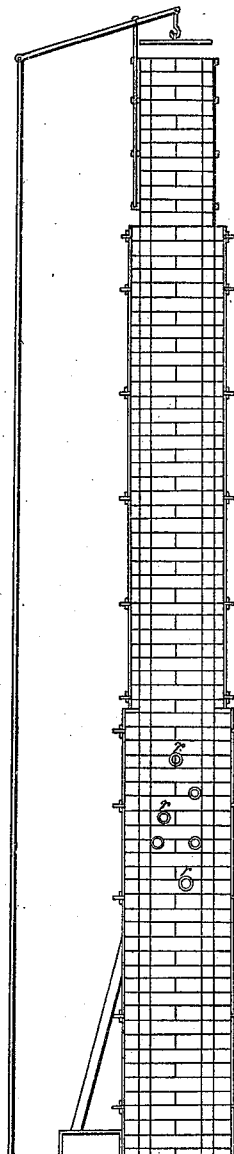

J. F. Winslow.
Furnace.

N° 4,520.   Patented May 10, 1846.

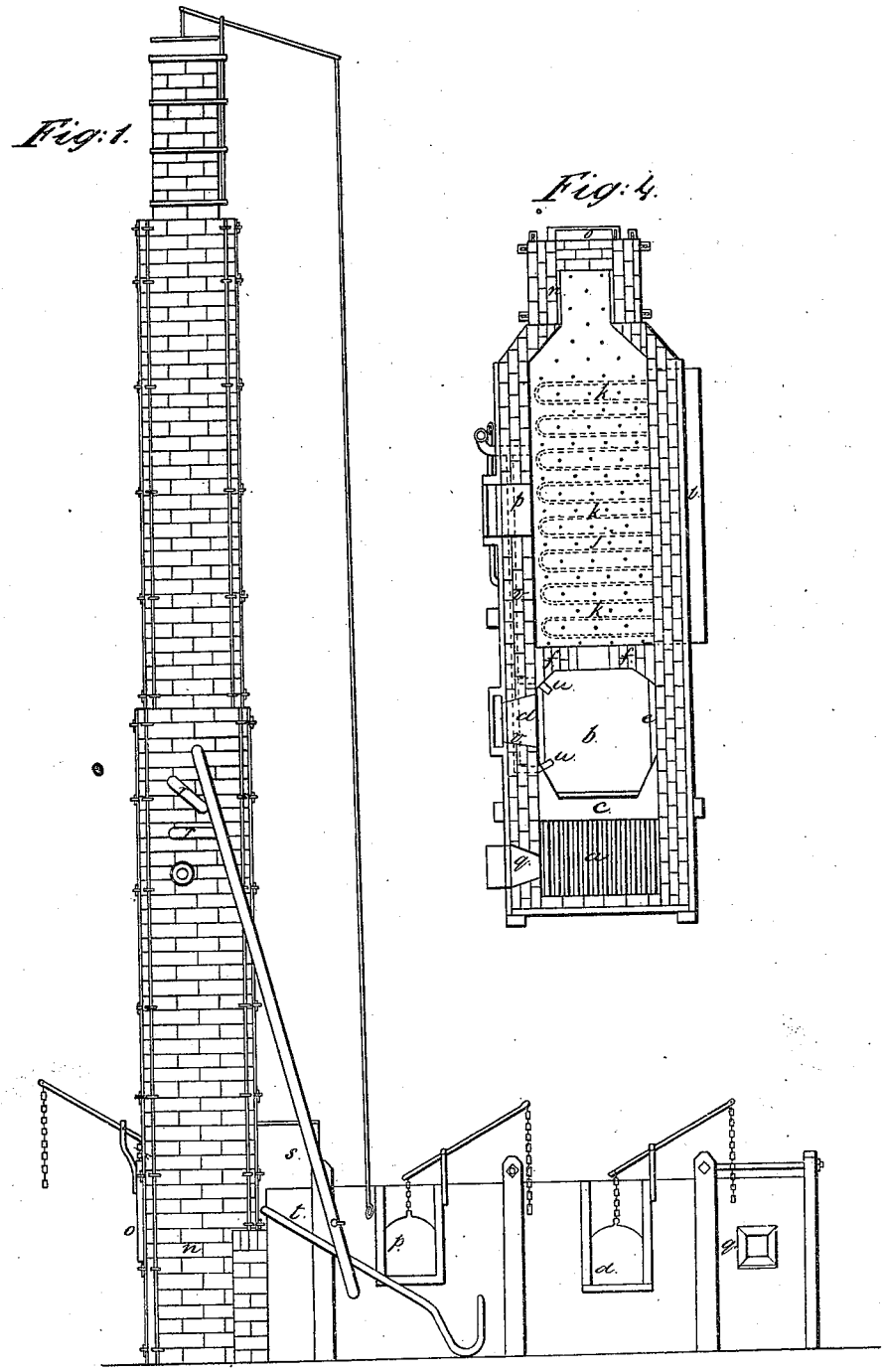

UNITED STATES PATENT OFFICE.

J. F. WINSLOW, OF TROY, NEW YORK.

IMPROVEMENT IN THE MODE OF MANUFACTURING MALLEABLE IRON DIRECTLY FROM THE ORES.

Specification forming part of Letters Patent No. 4,526, dated May 16, 1846.

*To all whom it may concern:*

Be it known that I, JOHN F. WINSLOW, of Troy, in the county of Rensselaer and State of New York, have invented new and useful Improvements in the Process of Manufacturing Malleable Iron Directly from the Ore, and in the furnace therefor; and I do hereby declare that the following is a full, clear, and exact description of the principle or character which distinguishes my invention from all other things before known, of the mode of procedure, and of the apparatus employed therefor, reference being had to the accompanying drawings, making part of this specification, in which—

Figure 1 is an elevation of a reverberatory furnace; Fig. 2, a longitudinal vertical section; Fig. 3, a cross vertical section taken at the line X X of Fig. 2, and Fig. 4 a horizontal section taken at the line Z Z of Fig. 2.

The same letters indicate like parts in all the figures.

My improved process is applicable to the treatment of oxides of iron only, and this I effect in reverberatory furnaces, although some parts of the process may be applied in furnaces without the reverberatory feature.

It has long been essayed to reduce the oxides of iron directly into the metallic state by heating the ores mixed with carbonaceous matter, with the view to produce deoxidation and then to transfer the mass thus treated to the puddling process; but in all these, which have so far been unsuccessful, the upper stratum only of the mass of ore and carbon was exposed to the direct action of the heat and flame, instead of the whole mass, and to avoid this evil it has been suggested to apply heat to the mass of ore and carbon below as well as above by placing the fire-grate directly under the furnace hearth or floor and then reverberating the flame and passing it over the charge. This modification, while it removes the leading objection of the process above indicated, introduces practical difficulties of such magnitude as to defeat the contemplated object.

My improvements effectually avoid these difficulties; and they consist in exposing the mass of pulverized ore mixed with carbonaceous matter to the combined action of a gentle flame or heat and currents of heated air passing through the mass, which in their passage not only agitate the mass to aid the mechanical liberation of the gases evolved, but aid in evolving the gases from the oxide and carbon, which in their nascent state combine and revive the metallic particles. The mass is then subjected to the combined action of a more intense flame and to highly-heated currents of carbureted-hydrogen gas that pass through the mass and take up the remaining oxygen of the ore and revive the metallic particles, and then the mass passes to the puddling process, where it is subjected to a still more intense heat and to the action of jets of highly-heated atmospheric air, to consume the carbonaceous matter and free it from other impurities. For the application of my improved process I have made important modifications in the well-known reverberatory furnace, which for this purpose is made of much greater length than those heretofore used.

In the accompanying drawings, which represent the furnace as modified, $a$ is the grate and $b$ the puddling hearth or floor, separated from the grate by the bridge $c$. The hearth is made with a slight inclination or pitch from the working-door $d$ toward the hole $e$, for the discharge of the slag, &c. At the side opposite the bridge the furnace is narrowed by means of two jamb-walls, $f f$, to narrow the flame and damp its intensity, and beyond these jamb-walls there is a flat cast-iron chamber, (divided into two compartments by a partition, $i$,) $g h$, the top $j$ of which inclines upward at an angle of about ten degrees, the lower and forward end being on a level with the edge of the working-bottom or hearth. This top plate is perforated with small holes of about three-eighths of an inch in diameter, for the passage of the blast of heated atmospheric air from the chamber $g$, and of carbureted hydrogen from the other chamber, $h$. To prevent this top plate, $j$, from being overheated, it is made of sufficient thickness to admit of siphon-tubes or water-passages $k$, which commence at one edge, pass along between two rows of blast-holes, around the end of one, and then back between two other rows to the edge of the plate, to form the communication with a cold-water chamber, $l$, at the side to establish a circulation of water through the tubes or passages. The reverberating top or arch $m$ of the furnace extends over this perforated plate to the chimney $n$, which is provided with a door at $o$ for the admission of the charge.

Along the front of the furnace there are two other doors, $p$ and $q$, one for giving admission to and the occasional stirring of the charge over the chamber $h$ and the other for working or balling the iron.

The blast of air which is introduced in the chamber $g$ may be heated in any known manner; but that which I have practiced is by passing it from the usual blower through a series of tubes, $r$, arranged in the chimney and leading to the chamber $g$, and the pipe which leads from the heating-tubes to this chamber should be provided with a regulating-valve. For the supply of carbureted hydrogen, the material from which the gas is generated—such as rosin—is placed in a vessel, $s$, situated on top of the arch and near the chimney, where it receives sufficient heat to melt the resin, &c., which passes from the box through the pipe $t$ into the chamber $h$, which answers the purpose of a retort for the generation of gas, in consequence of its proximity to the fire, and as the gas is generated it is driven through the apertures in the top plate and through the charge above. The pipe that forms the communication between the vessel $s$ and the chamber or retort $h$ should be provided with a cock to regulate the supply of melted resin or other material used for the production of the carbureted-hydrogen gas.

The blast of heated atmospheric air for the puddling is obtained from the chamber $g$ by forming a communication between this chamber and the tuyeres $u$ $u$—one on each side of the working-door—by means of the pipes $v$ $v$, and these pipes should be provided with cocks or valves in the usual manner, to enable the workman to regulate the supply of heated air, as may be required by the condition of the process. The ore, previously pulverized or granulated and well mixed with pulverized vegetable or mineral coal in proportions varying according to the quality of the ore, is introduced through the door $o$ and spread over that part of the perforated plate which covers the air-chamber $g$. The charge is laid on as thick as the capacity of the furnace will admit without interfering with the draft. It is there exposed to the action of the reverberated flame and the hot-air blast from the chamber $g$, which, passing through the numerous small holes in the plate, is diffused through the mass of ore and carbonaceous matter, thereby aiding in the process of decomposition and purification of the mass. When the workman perceives that the mass begins to cohere, the effect being produced first on that portion of the mass nearest the grate, he gradually transfers it to that part of the perforated plate which lies over the chamber $h$ or gas-retort, where it is subjected to the joint action of a more intense flame and carbureted hydrogen, to take up and remove the remaining portions or traces of oxygen and revivify the metallic portions. From this part of the process the mass is transferred to the working-bottom or puddling operation, where the mass is heated with the hot-blast to extract the remaining portions of carbonaceous matter, and as the slag is produced and separated it flows through the hole $e$. The transfer of the mass and the repetition of the charge is conducted in such manner as to correspond with the puddling operation.

In the last part of the operation, should it appear to the workman that the mass contains any portion of oxide—a condition well known to experienced puddlers—a small quantity of flowers of lime may be introduced as a flux, to complete the decomposition and increase the yield of metal.

Any mode of heating the blast for the first part of the deoxidizing and the puddling processes may be employed, as this makes no part of my invention. Nor do I wish to confine myself to the use of carbureted hydrogen in the second part of the deoxidizing process, or to the mode described of generating the gas, as I contemplate using hydrogen as well as carbureted hydrogen, generated in any desired manner, and I have only described the above mode as that which I have essayed and deem the simplest and most economical.

I do not claim as my invention simply the employment of a blast of atmospheric air in the puddling-chamber, this having been done heretofore with cold air in puddling pig-iron, and with heated air to consume the carbonic oxide evolved from the fire-chamber, while I employ it in a highly-heated state to consume the carbonaceous matter mixed with the ore.

What I claim as my invention in the process of making malleable iron directly from the ore is—

1. The passage of heated atmospheric air through the mass of ore and carbonaceous matter in the process of deoxidizing, as herein described.

2. The passage of hydrogen or carbureted-hydrogen gas through the mass in the process of deoxidizing iron ore, substantially as described, whether this be done after the ore has been partly deoxidized by the previous part of the process or not.

3. Treating the mass in the puddling-chamber with a blast of highly-heated atmospheric air to consume the carbonaceous matter, substantially as herein described.

4. In the furnace above described, making the plate or bed on which the ore is placed for deoxidizing with numerous perforations for the introduction and passage of highly-heated atmospheric air or other gases through the mass, for the purpose and in the manner described.

5. The perforated plate or bed, as described, in combination with the puddling-chamber, as described.

JNO. F. WINSLOW.

Witnesses:
CHAS. M. KELLER,
A. P. BROWNE.